(12) United States Patent
Dawson et al.

(10) Patent No.: US 8,963,063 B2
(45) Date of Patent: Feb. 24, 2015

(54) SYSTEMS AND METHODS FOR ADDING OR SUBTRACTING PIXELS

(75) Inventors: Robin M. A. Dawson, Watertown, MA (US); Steven Hoeschele, Newton, MA (US); Juha-Pekka J. Laine, Boston, MA (US); Benjamin F. Lane, Grafton, MA (US); Yaron Rachlin, Brookline, MA (US); Christopher C. Yu, Belmont, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 929 days.

(21) Appl. No.: 13/100,222

(22) Filed: May 3, 2011

(65) Prior Publication Data

US 2012/0280108 A1  Nov. 8, 2012

(51) Int. Cl.
  *H01L 27/00* (2006.01)
  *H04N 5/347* (2011.01)
  *H04N 5/3745* (2011.01)

(52) U.S. Cl.
  CPC ........... *H04N 5/347* (2013.01); *H04N 5/37457* (2013.01)
  USPC .................. 250/208.1; 250/214.1; 257/183.1; 257/292; 348/297; 348/298; 348/308

(58) Field of Classification Search
  CPC ...... H04N 5/37457; H01L 27/146; G01J 1/44
  USPC ................. 250/208.1, 214.1; 257/183.1, 292; 348/297, 298, 308
  See application file for complete search history.

(56) References Cited

U.S. PATENT DOCUMENTS

| | | | |
|---|---|---|---|
| 5,737,448 A | 4/1998 | Gardos | |
| 6,552,320 B1 * | 4/2003 | Pan | 250/208.1 |
| 6,836,289 B2 | 12/2004 | Koshiba et al. | |
| 6,919,549 B2 * | 7/2005 | Bamji et al. | 250/208.1 |
| 6,950,131 B1 | 9/2005 | Kleinhans et al. | |
| 7,173,656 B1 | 2/2007 | Dunton et al. | |
| 7,330,209 B2 | 2/2008 | Osamato | |
| 7,609,305 B2 | 10/2009 | Fainstain et al. | |
| 7,639,291 B2 | 12/2009 | Lim et al. | |
| 2007/0187609 A1 | 8/2007 | Karim | |
| 2008/0192132 A1 | 8/2008 | Bechtel et al. | |
| 2010/0134660 A1 | 6/2010 | Yamauchi | |
| 2010/0194944 A1 | 8/2010 | Chiu et al. | |
| 2010/0213351 A1 | 8/2010 | Iwamoto et al. | |

FOREIGN PATENT DOCUMENTS

WO   WO-2004093318 A2   10/2004

OTHER PUBLICATIONS

Candes et al., "An Introduction to Compressive Sampling," IEEE Signal Processing Magazine, Mar. 2004, p. 21.

(Continued)

*Primary Examiner* — Georgia Y Epps
*Assistant Examiner* — Kevin Wyatt
(74) *Attorney, Agent, or Firm* — Sunstein Kann Murphy & Timbers LLP (57) ABSTRACT

A pixel array including circuitry for combining charges accumulated by individual pixels in the array enables addition and/or subtraction of individual pixel values, prior to their digitization, in the pixel array.

20 Claims, 3 Drawing Sheets

(56) References Cited

OTHER PUBLICATIONS

Majidzadeh et al., "A (256x256) Pixel 76.7mW CMOS Imager/Compressor Based on Real-Time In-Pixel Compressive Sensing," in *IEEE International Symposium on Circuits and Systems (ISCAS)*, (Paris), 4 pgs, 2010.

Chapman, "A Self-Correcting Active Pixel Sensor Using Hardware and Software Correction," Design & Test, 2004, No. 6—Nov./Dec., pp. 544-551.

Kizhner, "New Methodology for Reducing Sensor and Readout Electronics Circuitry Noise in Digital Domain," 2009 NASA/ESA Conference on Adaptive Hardware and Systems, 2009, pp. 1-8.

Mendis et al. "CMOS Active Pixel Image Sensors for Highly Integrated Imaging Systems," IEEE Journal Of Solid-State Circuits, vol. 32, No. 2, Feb. 1997, pp. 187-197.

Philipp, "Linear Current-Mode Active Pixel Sensor," IEEE Journal of Solid-State Circuits, vol. 42, No. 11, Nov. 2007, pp. 2482-2485.

Robucci, "Compressive Sensing on a CMOS Separable-Transform Image Sensor," IEEE Intl. Conference on Acoustics, Speech and Signal Processing, Mar. 2008, pp. 5125-5128.

International Search Report and Written Opinion for PCT/US2012/035995, mailed Jul. 17, 2012, 12 pages.

\* cited by examiner

SYSTEMS AND METHODS FOR ADDING OR SUBTRACTING PIXELS

FIELD OF THE INVENTION

In various embodiments, the present invention relates to photo-sensing devices and methods and, in particular, to devices and methods suitable for compressive sampling.

BACKGROUND

Image capture and analysis now play a significant role in many industrial applications. For example, they may be employed in determining the orientation of a vehicle or platform, in vehicle navigation, and also in consumer products such as digital cameras and cellular phones. There is a trend toward increased resolution of the images captured, and storing a high-resolution image that includes millions of pixels typically requires a large amount of memory. But, some systems such as cameras in cell phones need to be small in size and, hence, permit the use of only a small on-board memory. Some other systems, such as those aboard satellites and spacecrafts, may be exposed to high radiation, requiring their on-board memory and/or processors to withstand high amounts of radiation. Such memory and processor components are relatively expensive compared to ordinary components of similar size and capacity that cannot withstand high radiation. It is, therefore, desirable to minimize the size of the memory and/or processor used in various imaging devices.

Typically, in image sensing, an image to be captured is divided into a matrix of pixels. The larger the required resolution, the smaller the size of each pixel and, correspondingly, the larger the number of pixels that must be sensed. The term "pixel" typically means a fraction of an image, but it is also commonly used to refer to the circuitry that senses the light received from a corresponding fraction of the image. Both meanings of the term are used herein.

Sensing a pixel generally includes measuring the intensity of the light corresponding to the pixel. In conventional imaging, each sensed pixel is digitized, i.e., the measured intensity of the light, generally expressed in the form of a voltage or current signal, is converted into a number that is stored in a memory cell. As such, high-resolution imaging, which requires a large number of pixels, typically requires a large memory.

Compressive sampling (which is also known as compressive sensing) is one approach that has been employed to meet the conflicting goals of high-resolution imaging and small-size memory. In certain cases, compressive sampling has decreased the required memory significantly, on a logarithmic scale. More specifically, in various existing approaches to compressive sampling, the total number of pixels P in an image are divided into N sets of M pixels, where M is typically much smaller than P. For example, M may be 10 or 100, while P can be as high as hundreds of millions. Then, for each set of M pixels, the values of some pixels are added to obtain a partial sum and the values of some pixels are subtracted from the partial sum to obtain a final pixel value corresponding to the set of M pixels. The pixels that are to be added or subtracted are determined according to a sampling function. For each set of M pixels, only the final pixel value is stored. As a result, compressive sampling generally only requires N memory cells, which is on the order of log P.

Although the final memory-storage requirement of compressive sampling can thus be substantially less than that of conventional imaging, compressive sampling still presents some challenges. As described above, the sampling functions require that a set of sensed pixels be added and/or subtracted. Unfortunately, the hardware used by many existing systems for compressive sampling requires that each pixel in the set of sensed pixels first be individually digitized so that the digitized values may then be added and/or subtracted by a processor. This requires a large temporary memory storage, significant processing capacity, and/or numerous interconnects for transferring the sensed pixels to a processor where the pixels may be digitized and processed (i.e., added or subtracted). In other words, the computational requirements of compressive sampling systems implemented significantly in the digital domain substantially undermine their benefits. Therefore, there is a need for improved systems and methods of sensing pixels that efficiently enable compressive sampling.

SUMMARY

In various embodiments, the present invention facilitates compressive sampling without requiring substantial temporary memory, processor capacity, or interconnects. This is achieved, in part, by performing addition and/or subtraction of pixels within the focal plane, without first digitizing the pixels. Unlike some methods in which pixel addition and/or subtraction is carried out by combining the currents flowing through one or more pixels, in various embodiments of the present invention the charges accumulated by the pixels are combined. The method by which the accumulated charges are combined makes the imaging system robust with respect to noise.

In general, charge accumulated by a pixel is proportional to the light received from the corresponding image pixel and, hence, the charge represents the image-pixel value. Therefore, a combination of the accumulated charges can be equivalent to adding and/or subtracting individual image-pixel values. While only one type of light-sensing element can be used for adding pixel values, the subtraction of pixels is typically performed using two different kinds of light-sensing elements. One type accumulates positive charges, while the other type accumulates negative charges. Combining like charges results in an addition of the sensed image-pixel values, while combining positive and negative charges results in a subtraction of the sensed image-pixel values.

In a pixel array, which may also be referred to as a sensor array, a sensor matrix, or a focal plane, various control signals permit selection of a set of pixels in the array required for addition and/or subtraction. After the charges accumulated by the pixels are combined (e.g., added or subtracted) a signal corresponding to the net charge is produced. This signal represents the processed (i.e., sampled) pixel value corresponding to the selected set of pixels. Only this value for each set of pixels is digitized and stored. Thus, because only a few pixel values are digitized, the demands on the analog to digital converter are dramatically reduced. This allows the processor to use significantly less power compared to the power required to digitize the sensed pixels. Moreover, relatively more time is available for each digitization so that these can be performed with greater accuracy, resulting in improved imaging performance.

In one aspect, embodiments of the invention feature a system for adding and/or subtracting pixels. The system includes a plurality of photo-sensitive pixels. Each photo-sensitive pixel outputs a charge to a common charge-sharing line. The system also includes circuitry, in electrical communication with the charge-sharing line, for producing an output signal related to the charge present on the charge-sharing line. In some embodiments, each photo-sensitive pixel includes a photo-sensitive element, which may be a p-type semiconductor photo diode, or an n-type semiconductor photo diode.

Each photo-sensitive pixel may also include a reset switch. The reset switch of each photo-sensitive element may be controlled by a common reset input, or, in the alternative, the reset switch of at least one photo-sensitive pixel may be controlled by a first reset input, and the reset switch of at least one other photo-sensitive pixel may be controlled by a second reset input.

In some embodiments, each photo-sensitive pixel of the system for adding and/or subtracting pixels includes a transfer switch in electrical communication with the common charge-sharing line. The transfer switch of each photo-sensitive pixel may be controlled by a common transfer input. Alternatively, the transfer switch of at least one photo-sensitive pixel may be controlled by a first transfer input, and the transfer switch of at least one other photo-sensitive pixel may be controlled by a second transfer input.

In a second aspect, embodiments of the invention feature a method for adding and/or subtracting pixels. The method includes outputting, by each of a plurality of photo-sensitive pixels, a charge to a common charge-sharing line, and producing an output signal related to the charge present on the charge-sharing line.

In some embodiments, the method includes resetting, for a reset period, a photo-sensitive element in at least one photo-sensitive pixel. The photo-sensitive element may be reset according to a reference voltage, and, as a result, a reference signal related to the reference voltage may be produced during the reset period. The method may also include comparing, after the reset period, the output signal with the reference signal.

In some embodiments, outputting the charge, by each of the plurality of photo-sensitive pixels, includes accumulating charge for a predetermined duration at a photo-sensitive element in the photo-sensitive pixel, and transferring the accumulated charge to the common charge-sharing line. The performances of the accumulating and transferring steps may overlap in part, or, in the alternative, the performance of the charge accumulating step may substantially precede the performance of the transferring step. Moreover, the transferring step may be performed substantially simultaneously at each photo-sensitive pixel.

In some embodiments, the charge transferring step is performed at a first set of photo-sensitive pixels substantially prior to performing the charge transferring step at a second set of photo-sensitive pixels. The step of producing the output signal may include producing a first output signal following the performance of the charge transferring step by the first set of photo-sensitive pixels, and producing a second output signal following the performance of the charge transferring step by the second set of photo-sensitive pixels. Arithmetic operations may also be performed on the first and second output signals. In some embodiments, the second set of photo-sensitive pixels includes all the photo-sensitive pixels in the first set.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means±10%, and in some embodiments±5%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figures 1, 2:
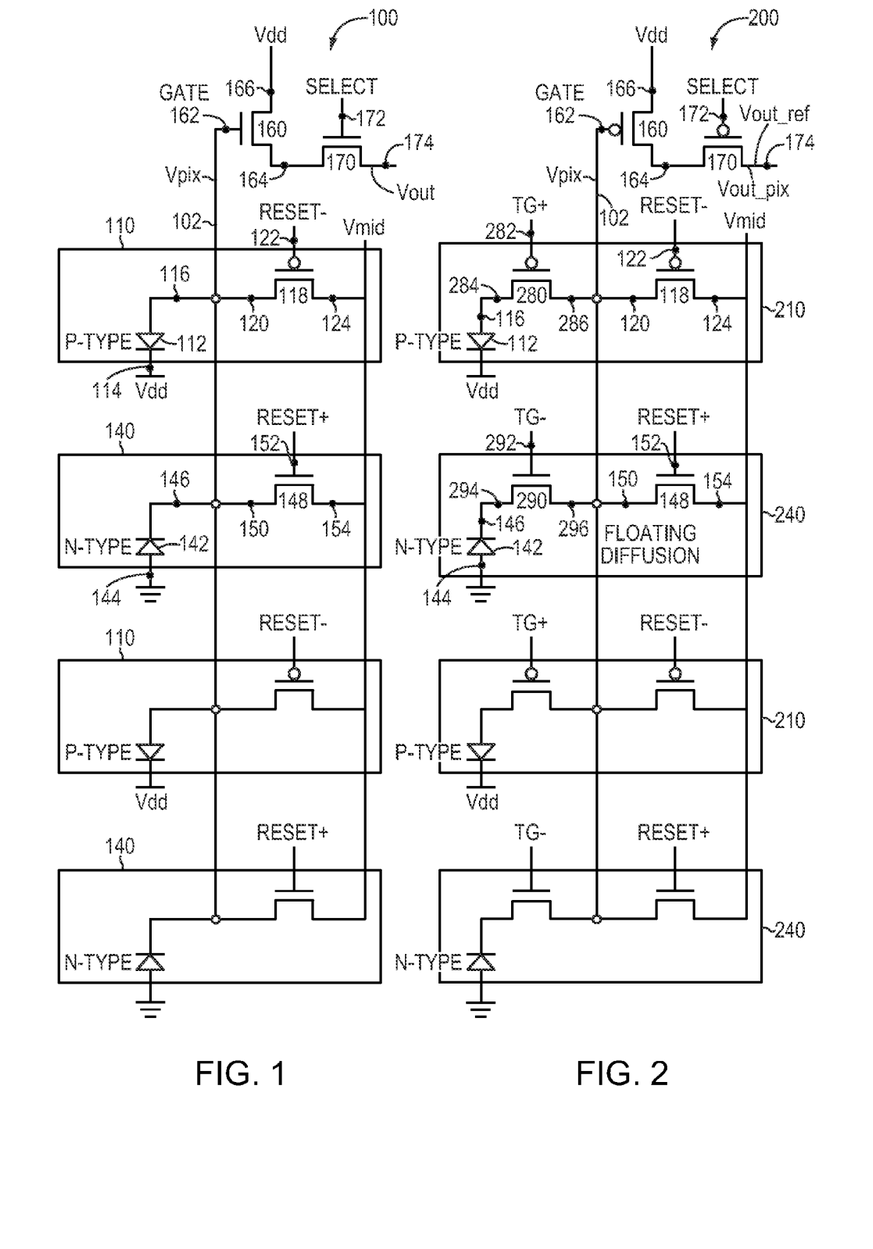
FIG. 1 schematically illustrates a pixel array for performing addition and/or subtraction of image pixels in accordance with one embodiment of the invention.
FIG. 2 schematically illustrates a pixel array for performing addition and/or subtraction of image pixels in accordance with another embodiment of the invention.

The pixel array 100 shown schematically in FIG. 1 includes photo-sensitive pixels 110, 140, i.e., circuitry for sensing light. Although only two photo-sensitive pixels 110 and two photo-sensitive pixels 140 are shown, the pixel array 100 may in fact include many more or fewer photo-sensitive pixels 110, 140. The pixel 110 includes a p-type photodiode 112 as a photo-sensitive element. The photodiode 112 in each pixel 110 corresponds to an image pixel, i.e., a fraction of the image to be sensed. More than one photodiode may also correspond to the same image pixel.

The cathode 114 of the p-type photodiode 112 is connected to a supply voltage denoted as Vdd. Vdd can be, for example, 3V or 5V. The anode 116 of the p-type photodiode 112 is connected to a charge-sharing line 102. More generally, as illustrated in the pixel array 100 of FIG. 1, the charge-sharing line 102 is connected to the anode 116 of each p-type photodiode 112 in each photo-sensitive pixel 110.

The anode 116 is also connected to a terminal 120 of a reset switch 118. The reset switch 118 also includes a control terminal 122, and a terminal 124 connected to a reference voltage denoted as Vmid. Typically, the reference voltage Vmid is less than the supply voltage Vdd. For example, if Vdd is 5V, Vmid can be 3.5V or 2.5V, and if Vdd is 3V, Vmid can be 1.5V or 1.2V. The control terminal 122 of the reset switch 118 in each pixel 110 is connected to a signal denoted as RESET−. Although the reset switch 118 of the pixel 110 is depicted as a p-type metal oxide semiconductor field-effect transistor (p-MOSFET), other types of switches including n-type MOSFETs (n-MOSFETs), transistors, and other non-semiconductor switches may also be used.

The pixel 140 includes an n-type photodiode 142 that can operate as a photo-sensitive element. The cathode 146 of the n-type photodiode 142 in each pixel 140 is connected to the charge sharing line 102. The anode 144 of the n-type photodiode is connected to a certain reference voltage, e.g., ground voltage or 0V, typically denoted as GND.

The cathode 146 is also connected to a terminal 150 of a reset switch 148. In a similar fashion to the reset switch 118 in the pixel 110, the reset switch 148 includes a control terminal 152, and a terminal 154 connected to the reference voltage Vmid. It should be understood, however, that although FIG. 1 shows the reference voltage Vmid connected to all pixels 110, 140, the reset switches of different pixels may in fact be connected to different reference voltages (e.g., Vmid1, Vmid2, etc.), having different values, such as 2.5V and 3V. The control terminal 152 of the reset switch 148 in each pixel 140 is connected to a signal denoted as RESET+. The reset switch 148 of the pixel 140 is depicted as an n-MOSFET, but, again, other types of switches such as p-MOSFETs, transistors, and other non-semiconductor switches may also be used.

The charge-sharing line 102 is connected to a GATE terminal 162 of a driver 160. The driver 160 is configured as a source follower, i.e., it produces an output at a DRAIN terminal 164 that is proportional to the voltage at the GATE terminal 162. The voltage at the GATE terminal 162 is determined by the charge accumulated on the charge-sharing line 102. A SOURCE terminal 166 of the driver 160 is connected to a supply voltage, e.g., Vdd.

The DRAIN terminal 164 of the driver 160 is connected to a select switch 170 having a SELECT input 172. When the SELECT input 172 is activated, the select switch 170 turns "on" and a signal (e.g., a voltage signal) at the DRAIN terminal 164 is substantially reproduced at the output terminal 174 of the select switch 170. The embodiment of the pixel array 100 depicted in FIG. 1 employs n-MOSFETS as the driver 160 and select switch 170. This, however, is for illustration only, and other types of devices such as p-MOSFETs, transistors, and other non-semiconductor devices may also be used as the driver 160 and/or select switch 170. Moreover, the device used for the driver 160 need not be of the same type as the device used for the select switch 170.

To perform image sensing, the pixel array 100 is exposed to a view to be imaged, such as a view from a camera. The reset switches 118, 148 are turned on substantially simultaneously by activating the respective select signals RESET– and RESET+. The signal RESET– is activated by setting it to a voltage that is substantially less than the voltage at the terminal 124, i.e., Vmid. For example, the signal RESET– may be set to 0V. The signal RESET+ is activated by setting it to a voltage substantially the same as the voltage Vmid at the terminal 154, e.g., 3.5V.

The reset signals are held active for a predetermined reset duration, on the order of a few nanoseconds. During this time, the photodiodes 112, 142 are "reset," i.e., the voltages at the anode 116 of the photodiode 112 and at the cathode 146 of the photodiode 142 are set to be approximately equal to Vmid. Accordingly, the voltage on the charge-sharing line 102 is also approximately equal to Vmid. After the reset duration, the reset switches 118, 148 are turned off substantially simultaneously by deactivating the respective select signals RESET– and RESET+.

Each photodiode 112, 142 that is exposed to a portion of the view to be imaged (i.e., an image pixel) accumulates a charge proportional to the intensity of the light incident upon the photodiode from the image pixel. In particular, the n-type photodiodes 142 accumulate and discharge electrons at the cathode 146. Because the number of electrons discharged at each cathode 146 is proportional to the intensity of the light from the associated image pixel, the number of electrons (i.e., the accumulated charge) at each cathode 146 represents the value of the associated image pixel. As all cathodes 146 are connected to the charge-sharing line 102, the electrons from all cathodes 146 are accumulated, i.e., "added" on the charge-sharing line 102. Thus, the charge on the charge-sharing line 102 due to the accumulated electrons is related to the sum of the image-pixel values associated with the photodiodes 142.

The p-type photodiodes 112 accumulate and discharge holes at the anode 116. In a similar fashion to the case of the n-type photodiodes 142, the number of holes discharged at the anode 116 of each p-type photodiode 112 is proportional to the intensity of the light from the image pixel associated with the photodiode 112. Accordingly, the number of holes (i.e., the accumulated charge) at each anode 116 represents the value of the associated image pixel. All anodes 116 are also connected to the charge-sharing line 102, so that the holes from all anodes 116 are accumulated, i.e., "added" on the charge-sharing line 102. Thus, the charge on the charge-sharing line 102 due to the accumulated holes is related to the sum of the image-pixel values associated with the photodiodes 112.

In the pixel array 100, all anodes 116 and cathodes 146 are connected to the charge-sharing line 102. As a result, the holes collectively discharged at all anodes 116 and the electrons collectively discharged at all cathodes 146 combine on the charge-sharing line 102. An electron-hole combination nullifies the charges associated with each individual electron and hole in the pair and, as a result, the charge on the charge-sharing line 102 can be expressed as the difference between the sum of charges due to all holes and the sum of charges due to all electrons. In effect, the charge on the charge-sharing line 102 represents the sum of pixel values associated with the p-type photodiodes 142 minus the sum of pixel values associated with the n-type photodiodes 112. Thus, the net charge on the charge-sharing line 102 corresponds to a pixel value obtained by adding the pixel values associated with the p-type photodiodes 142 and subtracting therefrom the pixel values associated with each n-type photodiode 112.

If more electrons were discharged at the cathodes 146 than holes discharged at the anodes 116, the net charge on the charge-sharing line 102 would be negative, causing the voltage on the charge-sharing line 102 to decrease from the reset value Vmid. Conversely, if more holes than electrons were discharged, the net charge would be positive, causing the voltage on the charge-sharing line 102 to increase from Vmid. The net voltage on the charge-sharing line 102, denoted as Vpix, is also present at the GATE 162 of the driver 160. Therefore, the voltage at the DRAIN terminal 164 changes according to Vpix.

After a pre-determined duration of accumulating the above-described charges, called the integration time (typically on the order of a few milliseconds), the select switch 170 is activated by activating the SELECT input 172. Then, an output signal, denoted as Vout, is produced at the output terminal 174 having a voltage substantially the same as the voltage at the DRAIN terminal 164. As the voltage at the DRAIN terminal 164 is related to Vpix, which represents the addition and subtraction of various image pixels, the signal Vout also represents addition and subtraction of the image pixels.

Advantageously, in the pixel array 100, the value of an individual image pixel is merely represented as a charge at an anode 116 or at a cathode 146. Individual pixel values are not digitized, and are not sent to a processor for analog-to-digital conversion. This substantially decreases the required processor capacity and the number of interconnects that would otherwise be required to deliver the charges sensed at each pixel 110, 140 to the processor for the analog-to-digital conversion. Moreover, a digitized value corresponding to each individual image pixel is not stored in a memory cell. Only the signal at the output 174 (i.e., Vout) is digitized and stored in memory. Thus, the size of the memory that is required to store the compressively sampled signals is substantially smaller than the memory that would otherwise be required to store each pixel value individually.

As mentioned, in the pixel array 100, circuitry including the driver 160 and the switch 170 produces a voltage at the output terminal 174 that is related to the voltage Vpix at the GATE terminal 162, but, in doing so, the circuitry generally introduces some noise (denoted as Vnoise). In addition, the voltage at the terminal 174 may also be offset by a threshold voltage Vth, a parameter associated with the driver 160 and selector-switch 170 circuitry. Typically, the noise and the threshold voltage are not known and, hence, the value corresponding only to the addition and/or subtraction of pixels cannot easily be extracted from the output signal Vout at the terminal 174.

Often, the noise and the threshold voltage offset values are not substantial, and do not significantly affect the accuracy of the added and/or subtracted pixel values obtained from the output signal Vout. In these cases, the pixel array 100 works just fine. In some very high-resolution image-sensing applications, however, it is desirable to mitigate or eliminate the effect of the noise and the threshold voltage. Some methods, such as obtaining a pixel value from the output signal Vout after resetting the photodiodes 112, 142, storing that value in a temporary memory, reading a pixel value corresponding to Vpix, as described above, and subtracting from this pixel value the value stored in the temporary memory can mitigate the effects of noise and threshold-voltage offset. The temporary memory storage and the subtraction operation, however, can significantly increase the system size and/or power consumption. The pixel array 200 illustrated in FIG. 2 can be employed, however, to avoid or mitigate the noise and threshold-voltage offset effects without substantially increasing the system size, power consumption, or cost.

In the pixel array 200, the pixel 210 includes a transfer switch 280 having a transfer control input 282. The anode 116 of the p-type photodiode 112 is connected to a terminal 284 of the transfer switch 280. A terminal 286 of the transfer switch 280 is connected to the charge-sharing line 102 and to the terminal 120 of the reset switch 118. The transfer control input 282 of each transfer switch 280 in each pixel 210 is connected to a signal TG+. The transfer switch 280 is illustrated as being a p-MOSFET, but it may also be another type of field-effect transistor (FET), transistor, or a non-semiconductor switch.

The pixel 240 includes a transfer switch 290 having a transfer control input 292. The cathode 146 of the n-type photodiode 142 is connected to a terminal 294 of the transfer switch 290. A terminal 296 of the transfer switch 290 is connected to the charge-sharing line 102 and to the terminal 150 of the reset switch 148. The transfer control input 292 of each transfer switch 290 in each pixel 240 is connected to a signal TG−. The transfer switch 290 is illustrated as being an n-MOSFET, but it may also be another type of FET, transistor, or a non-semiconductor switch. In the pixel array 200, one or more of the p-type photodiode 112 and/or one or more of the n-type photodiode 142 can be pinned photodiodes. Moreover, the pixels 210, 240 can be back-illuminated pixels and/or photogate pixels.

In operation of the pixel array 200, both the reset switch 118 and the transfer switch 280 in pixel 210 are turned on substantially simultaneously during the reset period. The transfer switch 280 is turned on by settling the signal TG+ to a voltage less than Vmid (e.g., 0 v). After resetting the photodiode 112, the reset switch 118 and the transfer switch 280 are turned off substantially simultaneously. The p-type photodiode 112 then accumulates charge according to the intensity of the light received from the image pixel associated with the photodiode 112. Accordingly, the photodiode 112 discharges holes at the anode 116, as described above. But, in this case, because the transfer switch 280 is turned off, these holes are not transferred to the nodes 286, 120 (collectively referred to as a floating-diffusion node) or to the charge-sharing line 102. The reset switch 118 is then turned on a second time, setting the voltage at the nodes 286, 120 substantially equal to Vmid, and is thereafter again turned off.

The pixel 240 is operated in a similar fashion, where both the transfer switch 290 and the reset switch 148 are turned on substantially simultaneously, thereby resetting the n-type photodiode 142, and then off substantially simultaneously so that the electrons discharged at the cathode 146 are not transferred to the nodes 296, 150. The reset switch 148 is then turned on a second time (substantially at the same time at which the reset switch 118 is turned on a second time), setting the voltage at the nodes 296, 150 substantially to Vmid, and is thereafter again turned off.

Once the voltage at nodes 286, 120 and 296, 150 are set substantially equal to Vmid, the select switch 172 is turned on. A first reading of the signal at the terminal 174, denoted as Vout_ref, is then related to Vmid. In particular, Vout_ref can be expressed as Vmid+Vth+Vnoise.

Subsequently, the transfer switches 280, 290 are turned on. As a result, the electrons accumulated at cathodes 146 are transferred to the charge-sharing line 102 through switches 290, and the holes accumulated at anodes 116 are also transferred to the charge-sharing line 102 through switches 280. As described above with reference to FIG. 1, the electrons and holes combine on the charge-sharing line 102 so as to represent a charge corresponding to a pixel value obtained by adding the individual pixel values associated with the p-type photodiodes 142 and subtracting therefrom the individual pixel values associated with each n-type photodiode 112.

Thus, the voltage on the charge-sharing line 102 after turning on the transfer switches 280, 290 corresponds to Vpix, as described above. A second reading of the signal at the terminal 174, denoted as Vout_pix, is related to Vpix, and may be expressed as Vpix+Vmid+Vth+Vnoise. The difference between Vout_pix and Vout_ref substantially eliminates the effect of Vth and Vnoise, i.e., the effect of the unknown threshold voltage and noise. Accordingly, the difference between the two readings of the output signal at the terminal 174 virtually yields only Vpix, which corresponds to the addition and/or subtraction of individual pixels.

Although in FIGS. 1 and 2 all p-type photodiodes 112 share common control inputs RESET− and/or TG+, and all n-type photodiodes 142 share common control inputs RESET+ and/or TG−, this is for illustrative purposes only. In other embodiments, only a subset of the p-type photodiodes 112 share a common reset control, or a common transfer control, or both. Similarly, only a subset of the n-type photodiodes 142 may share a common reset control, or a common transfer control, or both. In yet other embodiments, each photodiode may have a distinct pair of reset and transfer control inputs.

Figure 3:
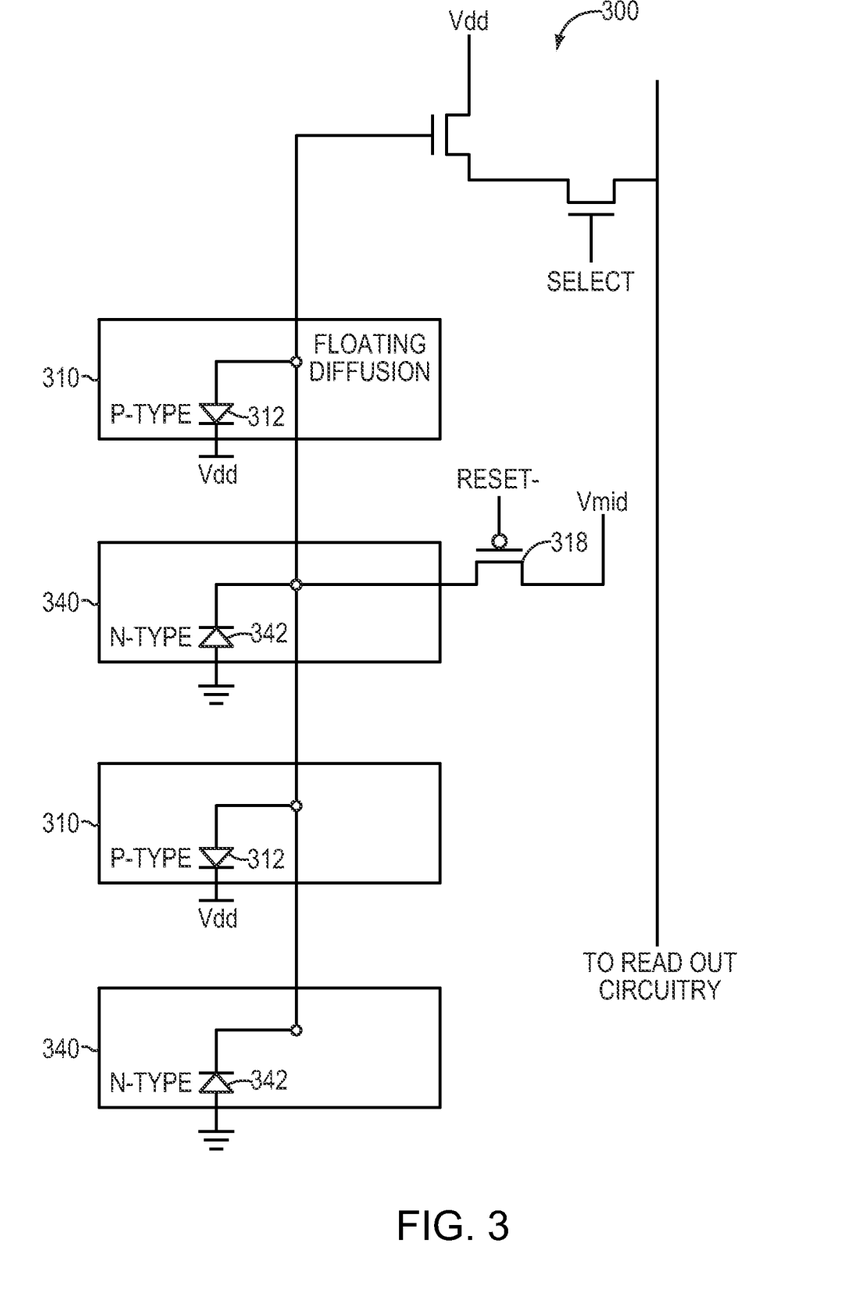
FIG. 3 schematically illustrates a pixel array for performing addition and/or subtraction of image pixels in accordance with an embodiment of the invention similar to that illustrated in FIG. 1, but in which all pixels are reset by a single switch.
Figure 4:
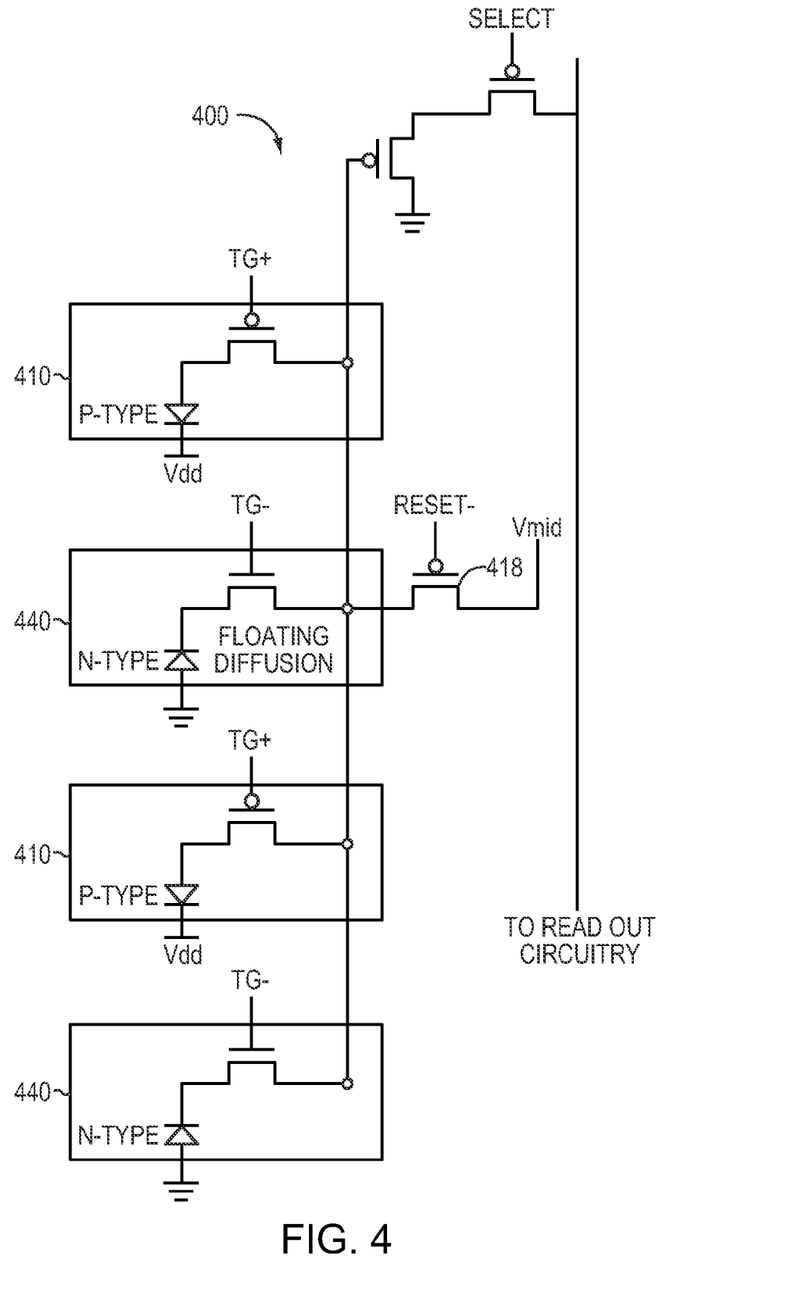
FIG. 4 schematically illustrates a pixel array for performing addition and/or subtraction of image pixels in accordance with an embodiment of the invention similar to that illustrated in FIG. 2, but in which all pixels are reset by a single switch

In a pixel array 300, depicted in FIG. 3, the pixels 310, 340 comprise p-type photodiodes 312 and n-type photodiodes 342, respectively, and each pixel 310, 340 shares a common reset switch 318. In this embodiment, the photodiodes 312, 342 may not be reset individually, but because fewer switches (e.g., transistors) are required compared to the pixel array 100 (shown in FIG. 1), the pixel array 300 can be smaller than the pixel array 100. Similarly, in the pixel array 400 shown in FIG. 4, the pixels 410, 440 share a common reset switch 418, and, hence, the photodiodes included therein may not be reset individually. But, the pixel array 400 can be smaller than the pixel array 200 shown in FIG. 2 due to the use of fewer switches.

In another embodiment according to the invention, a pixel array includes only one type of photodiode (e.g., only p-type photodiodes or only n-type photodiodes). One set of pixels, designated as "A" pixels, shares one pair of reset and transfer control signals, namely R1 and T1. Another set of pixels, designated as "B" pixels, shares another pair of reset and transfer control signals, namely R2 and T2. All pixels "A" and "B," however, are connected to the same charge-sharing line and driver/selector circuitry. Initially, the "A" and "B" pixels are reset by activating the R1, T1, R2, and T2 signals, as described above with reference to FIG. 2, and a signal Vout_ref is measured. Then, R1, R2, T1, and T2 are deactivated, and, after the integration time, only T1 is activated. A value corresponding to the sum of all "A" pixels, denoted as Vout_Apix, is measured. Soon thereafter, T2 is activated, allowing the charges accumulated by the "B" pixels to be combined with the charge accumulated by all "A" pixels, which is already present on the charge-sharing line. Accordingly, a value corresponding to the sum of all "A" and "B" pixels, denoted as Vout_A+Bpix, is measured. By digitizing Vout_Apix and Vout_A+Bpix, and by subtracting the digitized value of Vout_Apix from Vout_A+Bpix, a value corresponding to the sum of all "B" pixels can be obtained. From these values, a value corresponding to the sum of all "A" pixels minus the sum of all "B" pixels can also be computed.

In an alternative embodiment, after measuring Vout_Apix, as described above, the voltage at the charge-sharing line that is common to the "A" and "B" pixels is reset, e.g., to Vmid, by activating and deactivating the R1 and R2 signals. Then T2 is activated as before, but now only the charges accumulated by the "B" pixels are combined at the charge-sharing line. Accordingly, a value corresponding to the sum of all "B" pixels, denoted as Vout_Bpix, is measured. By digitizing Vout_Apix and Vout_Bpix, a value corresponding to the sum of all "A" pixels minus the sum of all "B" pixels and/or the sum of all "B" pixels minus the sum of all "A" pixels can be computed. The photodiodes corresponding to the "A" and "B" pixels can be of the same type or can be of different types, i.e., the "A" pixels may correspond to p-type or n-type photodiodes, and, accordingly, the "B" pixels may correspond to n-type or p-type photodiodes.

In yet another embodiment according to the invention, a pixel array includes more than one charge-sharing line, where each line is connected to a different set of pixels in the array. Each charge-sharing line may also be associated with a driver/selector circuitry such as that including the driver 160 and the select switch 170 shown in FIGS. 1 and 2. Accordingly, the pixels in the set associated with each charge-sharing line may be added and/or subtracted, and a signal representing the sampled (i.e., processed) pixel value for the associated set may be output from the driver/selector circuitry. These signals can be digitized, and additional arithmetic operations can be performed on the digitized values resulting in additions and/or subtractions, or other functions, of the sums of pixel values from each set.

In general, a pixel array or focal plane can be configured as an M×N matrix where N is the number of charge-sharing lines and output signals, and M is the number of pixels in a set associated with each charge-sharing line. For example, a 2×2 pixel array includes two charge-sharing lines C1, C2, two pixels p11, p12 connected to line C1, and two pixels p21, p22 connected to line C2. All four pixels may be of the same type (i.e., accumulating electrons, or accumulating holes), or p11, p12 may be of one type and p21, p22 may be of a different type. Alternatively, p11, p21 may be of one type and p12, p22 may be of a different type. Other configurations of pixel arrays, e.g., 4×2, 4×4, 8×2, 8×4, 8×8, etc., are also within the scope of the invention. The numbers M and N can be selected to be substantially larger than 8 (e.g., 64 or larger) so as to meet the requirements of a suitable sampling function.

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A system for subtracting pixel values, the system comprising:
   at least one first photo-sensitive pixels, the at least one first photo-sensitive pixel outputting a charge to a common charge-sharing line;
   at least one second photo-sensitive pixel, the at least one second photo-sensitive pixel outputting a charge to the common charge-sharing line, the charge output by each second photo-sensitive pixel effectively being of opposite polarity to the charge output by each first photo-sensitive pixel, such that an accumulated charge present on the common charge-sharing line is a difference between the charge output by the at least one first photo-sensitive pixel and the charge output by the at least one second photo-sensitive pixel; and
   circuitry, in electrical communication with the charge-sharing line, configured to produce an output signal related to the accumulated charge present on the charge-sharing line.

2. The system of claim 1, wherein each photo-sensitive pixel comprises a photo-sensitive element.

3. The system of claim 1, wherein each first photo-sensitive pixel comprises a p-type semiconductor photo diode, and each second photo-sensitive pixel comprises an n-type semiconductor photo diode.

4. The system of claim 1, wherein each photo-sensitive pixel comprises a reset switch controlled by a common reset input.

5. The system of claim 4, wherein:
   each first photo-sensitive pixel is electrically coupled to a reference voltage and each second photo-sensitive pixel is electrically coupled to the reference voltage; and
   each reset switch is configured to selectively supply a voltage, intermediate between the reference voltage and a supply voltage, to its photo-sensitive pixel.

6. The system of claim 1, wherein each photo-sensitive pixel comprises a reset switch, the reset switch of at least one photo-sensitive pixel being controlled by a first reset input and the reset switch of at least one other photo-sensitive pixel being controlled by a second reset input.

7. The system of claim 6, wherein:
   each first photo-sensitive pixel is electrically coupled to a reference voltage and each second photo-sensitive pixel is electrically coupled to the reference voltage; and
   each reset switch is configured to selectively supply a voltage, intermediate between the reference voltage and a supply voltage, to its photo-sensitive pixel.

8. The system of claim 1, wherein each photo-sensitive pixel comprises a transfer switch in electrical communication with the common charge-sharing line.

9. The system of claim 8, wherein the transfer switch of each photo-sensitive pixel is controlled by a common transfer input.

10. The system of claim 8, wherein the transfer switch of at least one photo-sensitive pixel is controlled by a first transfer input and the transfer switch of at least one other photo-sensitive pixel is controlled by a second transfer input.

11. The system of claim 1, wherein:
each first photo-sensitive pixel is electrically coupled to a reference voltage and each second photo-sensitive pixel is electrically coupled to the reference voltage; and further comprising:
a reset switch configured to selectively supply a voltage, intermediate between the reference voltage and a supply voltage, to each first photo-sensitive pixel and to each second photo-sensitive pixel.

12. A method for subtracting pixel values, the method comprising:
outputting, by each pixel of at least one first photo-sensitive pixels, a charge to a common charge-sharing line;
outputting, by each pixel of at least one second photo-sensitive pixel, a charge to the common charge-sharing line, the charge output by each second photo-sensitive pixel effectively being of opposite polarity to the charge output by each first photo-sensitive pixel, such that an accumulated charge present on the common charge-sharing line is a difference between the charge output by the at least one first photo-sensitive pixel and the charge output by the at least one second photo-sensitive pixel; and
producing an output signal related to the accumulated charge present on the charge-sharing line.

13. The method of claim 12 further comprising:
resetting, for a reset period, a photo-sensitive element in at least one photo-sensitive pixel according to a reference voltage, wherein a reference signal related to the reference voltage is produced during the reset period; and
after the reset period, comparing the output signal with the reference voltage.

14. The method of claim 12, wherein outputting the charge, by each pixel of the at least one first photo-sensitive pixel and by each pixel of the at least one second photo-sensitive pixel, comprises:
accumulating charge for a predetermined duration at a photo-sensitive element in the pixel; and
transferring the accumulated charge to the common charge-sharing line.

15. The method of claim 14, wherein the accumulating and the transferring overlap in part.

16. The method of claim 14, wherein the accumulating substantially precedes the transferring.

17. The method of claim 14, wherein the transferring is performed substantially simultaneously at the at least one first photo-sensitive pixel and at the at least one second photo-sensitive pixel.

18. The method of claim 14, wherein the transferring occurs at a first set of the at least one first photo-sensitive pixel and the at least one second photo-sensitive pixel substantially prior the transferring occurring at a second set of the at least one first photo-sensitive pixel and the at least one second photo-sensitive pixel.

19. The method of claim 18, wherein the producing the output signal comprises:
producing a first output signal following the transferring at the first set of the at least one photo-sensitive pixel; and
producing a second output signal following the transferring at the second set of the at least one photo-sensitive pixel.

20. The method of claim 19 further comprising performing arithmetic operations on the first and second output signals.

\* \* \* \* \*